Dec. 12, 1961   A. F. ARNOLD   3,012,361
FISH HOOK HOLDER
Filed Aug. 21, 1959
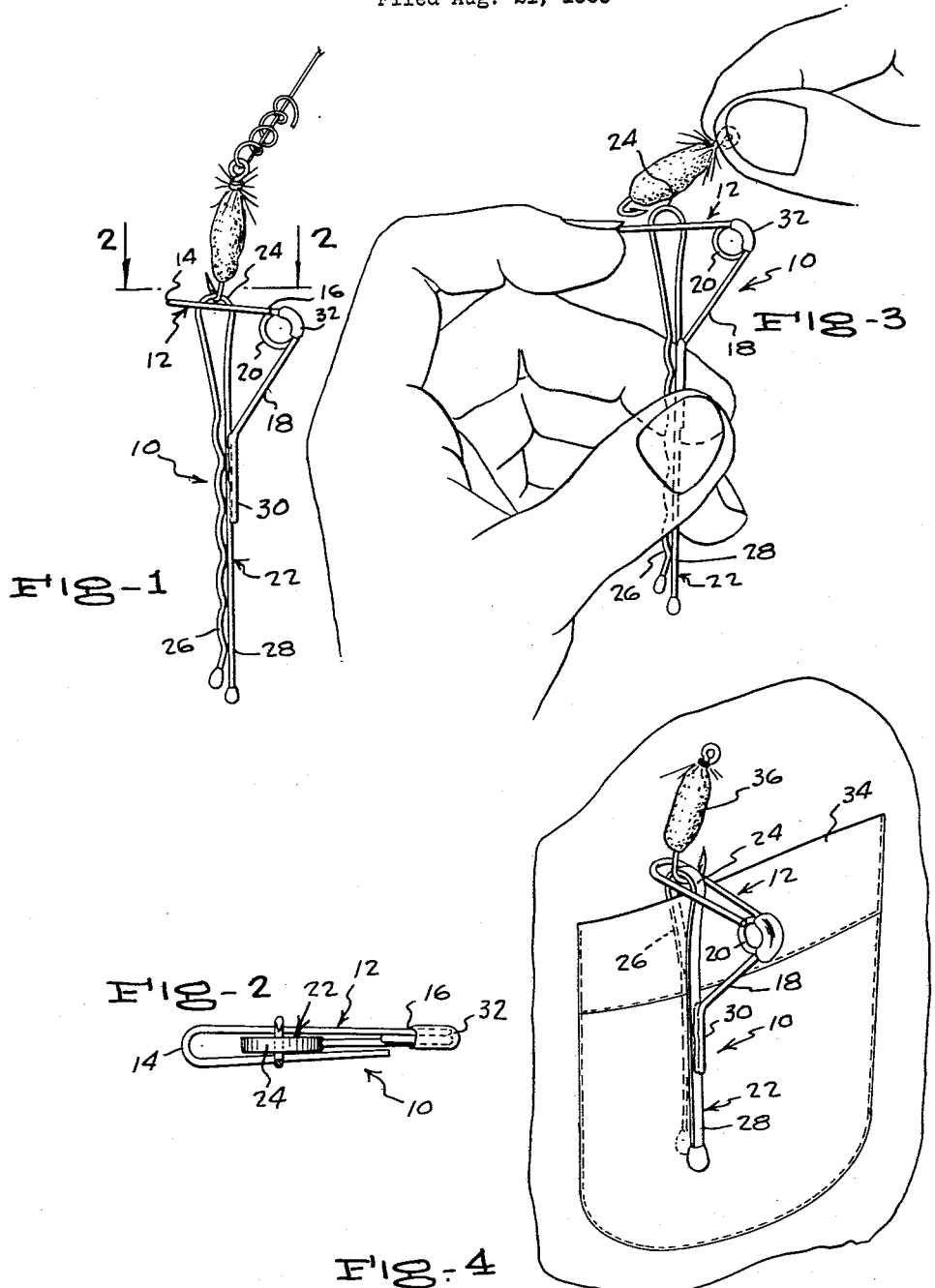
INVENTOR.
ARTHUR F. ARNOLD
BY
McMorrow, Berman + Davidson
ATTORNEYS

United States Patent Office 3,012,361
Patented Dec. 12, 1961

3,012,361
FISH HOOK HOLDER
Arthur F. Arnold, 315 6th St. S.E., Sidney, Mont.
Filed Aug. 21, 1959, Ser. No. 835,353
1 Claim. (Cl. 43—57.5)

The present invention relates to a holder for a fish hook or fly.

Previously proposed and presently in use are vises or holders by means of which a single fish hook or fly may be supported while a fishing line or leader is attached thereto. Such holders as have been proposed and are in use are not wholly successful for many reasons. Occasionally the holder or vise proposed is of such size that it is not easily carried in the pocket of a fisherman's shirt or coat. Generally, the holders or vises are intended for use over a work bench and are constructed for support upon the work bench when in use.

An object of the present invention is to provide a holder for a fish hook or fly which lends itself to ready portability and supported upon the free edge of a pocket of a shirt, and one which may be employed to support a fish hook or fly while the holder itself is supported upon the pocket of a shirt or coat.

Another object of the present invention is to provide a fish hook holder which lends itself to ease of handling when tying a fishing line or leader to a fish hook supported thereon, one which receives and releases a fish hook with a minimum of manipulation, and one which may be economically manufactured in quantity.

A further object of the present invention is to provide a holder for a fish hook or fly which is simple in structure, one having long-life characteristics, and one which is highly effective in action.

These and other objects and advantages of the present invention will be fully apparent from the following description when taken in conjunction with the annexed drawing, in which:

FIGURE 1 is an elevational view of the holder of the present invention, shown with a fishing fly in a position supported upon the holder;

FIGURE 2 is a view taken on the line 2—2 of FIGURE 1;

FIGURE 3 is a view showing how the loop is depressed for insertion of a fish hook into the holder of the present invention; and FIGURE 4 is an isometric view showing the holder in a position of support upon the free edge of a pocket, with a fish hook supported in the holder.

Referring in greater detail to the drawing in which like numerals indicate like parts throughout the several views, the holder for a fish hook or fishing fly of the present invention is designated generally by the reference numeral 10 and it comprises a horizontally disposed resilient loop 12 fabricated of wire and having a forward end 14 and a rearward end 16.

A resilient leg 18 extends downwardly from the rearward end 16 of the loop 12 and slopes toward the forward end 14 of the loop 12. The leg 18 is formed integrally with the loop 12 and has its upper end connected to the rearward end 16 of the loop 12 by a single convolution 20.

The holder includes an upstanding inverted resilient U-shaped member 22 positioned so that the bight 24 and the adjacent portions of the legs 26 and 28 are circumscribed by the forward end 14 of the loop 12.

Means, such as solder or the like, is employed to fixedly attach the vertical portion 30 of the leg 18 to the one leg 28 of the member 22 intermediate the ends of the leg 28. The portion 30 connects the member 22 to the loop 12 for resilient movement of the loop 12 toward and away from the leg 18. A shield 32 covers the double portion of the convolution 20 and prevents engagement between the double portion of the convolution 20 of any thread or fishing line.

The portions of the legs 26 and 28 inwardly of the free ends thereof are bent toward each other so as to provide a gripping means for support of the holder 10 upon a flexible support such as the free edge of a pocket 34 of a man's shirt or coat, as shown in FIGURE 4.

In use, a fishing fly, as designated by the numeral 36, or fishing hook may be supported in the holder 10 by insertion of the curved portion of the fly 36 beneath the bight 24 of the member 22 after application of a downwardly directed force to the forward end 14 of the loop 12, as shown in FIGURE 3. When the loop 12 is moved downwardly, against the resiliency of the convolution 20 and leg 18, the bight 24 provides an eye for the reception of the fish hook or fishing fly 36, it being necessary to only move the loop 12 downwardly a distance sufficient to provide the eye and upon release of the loop 12, the portions of the loop adjacent the bight 24 bear against and support the fishing fly or fish hook in an upright direction, as shown in FIGURES 1 and 4.

What is claimed is:

A fish hook holder comprising a horizontally disposed resilient loop having a forward end and a rearward end, an upstanding inverted resilient U-shaped member having free ends and positioned so that the bight and the adjacent portions of the legs are circumscribed by the forward end of said loop, the portions of the legs of said member inwardly of the free ends thereof being bent toward each other so as to provide a gripping means for a flexible support when inserted therebetween, a resilient leg extending downwardly from the rearward end of said loop and sloping toward the forward end of said loop and having the upper end connected to the rearward end of said loop for resilient movement of said loop relative to said leg, and means fixedly attaching the lower end of said leg to a leg of said member, the forward end of said loop upon application of a downwardly directed force thereto being movable below the bight of said member a sufficient distance to provide an eye for reception therein of a fish hook.

References Cited in the file of this patent

UNITED STATES PATENTS

| | | |
|---|---|---|
| 2,522,911 | Weaver | Sept. 19, 1950 |
| 2,537,663 | Geiger | Jan. 9, 1951 |
| 2,764,839 | Wylie | Oct. 2, 1956 |